US010481625B2

(12) United States Patent
Kurozo et al.

(10) Patent No.: US 10,481,625 B2
(45) Date of Patent: Nov. 19, 2019

(54) VOLTAGE REGULATOR

(71) Applicant: ABLIC Inc., Chiba-shi, Chiba (JP)

(72) Inventors: Tadashi Kurozo, Chiba (JP); Tomoyuki Yokoyama, Uozu (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/003,983

(22) Filed: Jun. 8, 2018

(65) Prior Publication Data

US 2018/0292854 A1 Oct. 11, 2018

Related U.S. Application Data

(62) Division of application No. 14/287,999, filed on May 27, 2014, now Pat. No. 10,061,335.

(30) Foreign Application Priority Data

May 31, 2013 (JP) ................................ 2013-115665
Mar. 19, 2014 (JP) ................................ 2014-056449

(51) Int. Cl.
*H02M 3/158* (2006.01)
*H02M 1/32* (2007.01)
*G05F 1/575* (2006.01)

(52) U.S. Cl.
CPC .................................. *G05F 1/575* (2013.01)

(58) Field of Classification Search
CPC .... H02M 3/156; H02M 3/158; H02M 3/1582; H02M 3/1588; Y02B 70/1466; G05F 1/575
USPC .......................................................... 323/271
See application file for complete search history.

(56) References Cited

U.S. PATENT DOCUMENTS

| | | | | |
|---|---|---|---|---|
| 7,294,994 B2 * | 11/2007 | Ryu | H02M 1/08 323/282 |
| 2002/0180409 A1 | 12/2002 | Nakajima | |
| 2006/0022652 A1 | 2/2006 | Nishimura et al. | |
| 2006/0113980 A1 | 6/2006 | Yoshida | |
| 2008/0061881 A1 * | 3/2008 | Takagi | H03F 1/0277 330/261 |

(Continued)

FOREIGN PATENT DOCUMENTS

| | | |
|---|---|---|
| JP | 2005-301439 A | 10/2005 |
| JP | 2007-280025 A | 10/2007 |

*Primary Examiner* — Jeffrey A Gblende
*Assistant Examiner* — Monica Mata
(74) *Attorney, Agent, or Firm* — Brinks Gilson & Lione

(57) ABSTRACT

Provided is a voltage regulator having satisfactory transient response characteristics. The voltage regulator includes: a first amplifier for detecting that undershoot occurs in an output voltage; a second amplifier for detecting that overshoot occurs in the output voltage; a first constant current circuit for increasing a bias current of an error amplifier circuit by a first amount for a first time period in response to a signal determined based on one of an output signal of the first amplifier and an output signal of the second amplifier; a second constant current circuit for increasing the bias current of the error amplifier circuit by a second amount larger than the first amount for a second time period shorter than the first time period in response to a signal determined based on the output signal of the first amplifier; and a first switch circuit for pulling up a gate of an output transistor in response to a signal determined based on the output signal of the second amplifier.

10 Claims, 8 Drawing Sheets

(56) References Cited

U.S. PATENT DOCUMENTS

| | | | | |
|---|---|---|---|---|
| 2011/0169471 | A1* | 7/2011 | Nagasawa ........... | H02M 3/1584 323/283 |
| 2013/0002220 | A1 | 1/2013 | Terada | |

* cited by examiner

VOLTAGE REGULATOR

RELATED APPLICATIONS

This application is divisional of U.S. patent application Ser. No. 14/287,999 which claims priority under 35 U.S.C. § 119 to Japanese Patent Application Nos. 2013-115665 filed on May 31, 2013 and 2014-056449 filed on Mar. 19, 2014, the entire contents of which are hereby incorporated by reference.

BACKGROUND OF THE INVENTION

1. Field of the Invention

The present invention relates to a transient response improvement circuit for a voltage regulator.

2. Description of the Related Art

FIG. 7 is a circuit diagram of a related-art voltage regulator including a transient response improvement circuit. The related-art voltage regulator includes a reference voltage circuit 101, an error amplifier circuit 102, a bias circuit 103, an output transistor 104, a PMOS transistor 107, resistors 105 and 106, and amplifiers 110 and 111. The reference voltage circuit 101 outputs a reference voltage Vref. The resistors 105 and 106 output a divided voltage Vfb obtained by dividing an output voltage Vout of an output terminal 109. The amplifiers 110 and 111 each compare the divided voltage Vfb and the reference voltage Vref with each other.

When overshoot occurs in the output voltage Vout, and the divided voltage Vfb becomes higher than the reference voltage Vref, the amplifier 110 outputs a Low level signal to turn on the PMOS transistor 107. In this case, the amplifier 111 outputs a high-level signal, and hence a current value of the bias circuit 103 does not change. Accordingly, a current Ia for pulling up a gate of the output transistor 104 flows to reduce a gate-source voltage of the output transistor 104, to thereby reduce the supply of current to the output terminal 109. The voltage regulator operates in this manner, thereby being capable of preventing an increase in overshoot in the output voltage Vout of the output terminal 109.

When undershoot occurs in the output voltage Vout of the output terminal 109, and the divided voltage Vfb becomes lower than the reference voltage Vref, the amplifier 111 outputs a Low level signal to increase the current of the bias circuit 103, in other words, increase an operating current of the error amplifier circuit 102. In this case, the amplifier 110 outputs a High level signal to maintain the PMOS transistor 107 to be turned off, and hence the current Ia does not flow. Accordingly, a slew rate for increasing the gate-source voltage of the output transistor 104 is improved, and a slew rate for enhancing the supply of current to the output terminal 109 is also improved. The voltage regulator operates in this manner, thereby being capable of preventing an increase in undershoot in the output voltage Vout of the output terminal 109.

FIG. 8 is a circuit diagram illustrating another example of a related-art voltage regulator including a transient response improvement circuit. The related-art voltage regulator according to the another example includes a reference voltage circuit 101, an error amplifier circuit 102, bias circuits 103 and 203, an output transistor 104, PMOS transistors 107, 202, and 207, resistors 105 and 106, and amplifiers 110 and 111. In the related-art voltage regulator according to the other example, an amplifier stage including the PMOS transistor 202 and the bias circuit 203 is interposed between the error amplifier circuit 102 and the output transistor 104.

When overshoot occurs in an output voltage Vout, and a divided voltage Vfb becomes higher than a reference voltage Vref, the amplifier 110 outputs a Low level signal to turn on the PMOS transistor 107. In this case, the amplifier 111 outputs a high-level signal, and hence a current value of the bias circuit 103 does not change. Accordingly, a current Ia for pulling up a gate of the output transistor 104 flows to reduce a gate-source voltage of the output transistor 104, to thereby reduce the supply of current to the output terminal 109. The voltage regulator operates in this manner, thereby being capable of preventing an increase in overshoot in the output voltage Vout of the output terminal 109.

When undershoot occurs in the output voltage Vout of the output terminal 109, and the divided voltage Vfb becomes lower than the reference voltage Vref, the amplifier 111 outputs a Low level signal to increase the current of the bias circuit 103, in other words, increase an operating current of the error amplifier circuit 102. In this case, the amplifier 110 outputs a High level signal to maintain the PMOS transistor 107 to be turned off, and hence the current Ia does not flow. Accordingly, a slew rate for increasing the gate-source voltage of the output transistor 104 is improved, and a slew rate for enhancing the supply of current to the output terminal 109 is also improved. In addition, the PMOS transistor 207 is turned on to supply a current Ib for pulling up a gate of the PMOS transistor 202, to thereby reduce a gate-source voltage of the PMOS transistor 202 to reduce the supply of current to the gate of the output transistor 104. The voltage regulator operates in this manner, thereby being capable of preventing an increase in undershoot in the output voltage Vout of the output terminal 109 (for example, see Japanese Patent Application Laid-open No. 2002-351556).

However, in the relate-art voltage regulators each including the transient response improvement circuit, the output voltage Vout may oscillate when the increased current of the bias circuit 103 is returned to its original value or when the PMOS transistor 107 or 207 is switched from on to off.

SUMMARY OF THE INVENTION

The present invention has been made in view of the above-mentioned problem, and provides a voltage regulator including a transient response improvement circuit capable of greatly enhancing a transient response improvement effect while preventing oscillation of an output voltage.

In order to solve the related-art problem, a voltage regulator according to one embodiment of the present invention is configured as follows.

Specifically, there is provided a voltage regulator, including: a first amplifier for detecting that undershoot occurs in an output voltage; a second amplifier for detecting that overshoot occurs in the output voltage; a first constant current circuit for increasing a bias current of an error amplifier circuit by a first amount for a first time period in response to a signal determined based on one of an output signal of the first amplifier and an output signal of the second amplifier; a second constant current circuit for increasing the bias current of the error amplifier circuit by a second amount larger than the first amount for a second time period shorter than the first time period in response to a signal determined based on the output signal of the first amplifier; and a first switch circuit for pulling up a gate of an output transistor in response to a signal determined based on the output signal of the second amplifier.

According to the voltage regulator of one embodiment of the present invention, the bias current of the error amplifier circuit is increased for a while after overshoot or undershoot is improved, and hence transient response characteristics can be improved without causing oscillation. Further, the overshoot and undershoot can be improved effectively by the two switch circuits.

DETAILED DESCRIPTION OF THE PREFERRED EMBODIMENTS

Now, embodiments of the present invention are described with reference to the accompanying drawings.

First Embodiment

Figure 1:
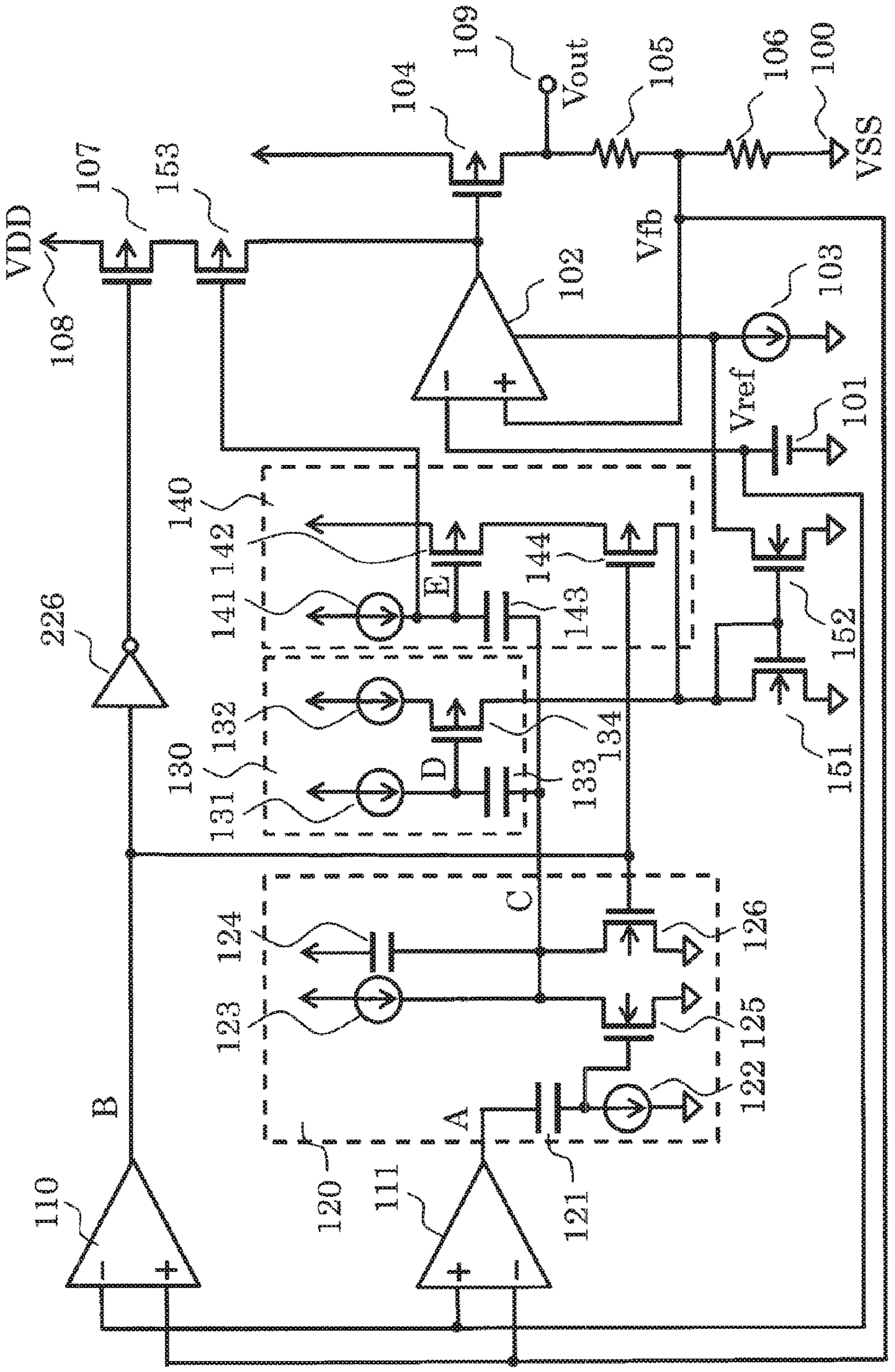
FIG. 1 is a circuit diagram of a voltage regulator according to a first embodiment of the present invention.

FIG. 1 is a circuit diagram of a voltage regulator according to a first embodiment of the present invention.

The voltage regulator according to the first embodiment includes a reference voltage circuit 101, an error amplifier circuit 102, a bias circuit 103, an output transistor 104, PMOS transistors 107 and 153, NMOS transistors 151 and 152, resistors 105 and 106, amplifiers 110 and 111, a delay circuit 120, constant current circuits 130 and 140, and an inverter 226.

The delay circuit 120 includes bias circuits 122 and 123, capacitors 121 and 124, and NMOS transistors 125 and 126. The constant current circuit 130 includes bias circuits 131 and 132, a capacitor 133, and a PMOS transistor 134. The constant current circuit 140 includes a bias circuit 141, a capacitor 143, and PMOS transistors 142 and 144. The amplifier 110, the inverter 226, and the PMOS transistor 107 construct an overshoot improvement circuit. The amplifier 111, the constant current circuit 140, and the delay circuit 120 construct an undershoot improvement circuit.

The output transistor 104 has a drain connected to an output terminal 109 and a source connected to a power supply terminal 108. The resistor 105 and the resistor 106 are connected between the output terminal 109 and a ground terminal 100. The error amplifier circuit 102 has an inverting input terminal connected to a positive electrode of the reference voltage circuit 101, a non-inverting input terminal connected to a connection point between the resistors 105 and 106, and an output terminal connected to a gate of the output transistor 104. The bias circuit 103 is connected to the error amplifier circuit 102 as a current source. The amplifier 110 has an inverting input terminal connected to the positive electrode of the reference voltage circuit 101, a non-inverting input terminal connected to the connection point between the resistors 105 and 106, and an output terminal connected to an input terminal of the inverter 226. The amplifier 111 has a non-inverting input terminal connected to the positive electrode of the reference voltage circuit 101, an inverting input terminal connected to the connection point between the resistors 105 and 106, and an output terminal connected to one terminal of the capacitor 121. The other terminal of the capacitor 121 is connected to the bias circuit 122 and a gate of the NMOS transistor 125. The NMOS transistor 125 has a drain connected to the bias circuit 123 and a source connected to the ground terminal 100. The NMOS transistor 126 has a gate connected to the output terminal of the amplifier 110, a drain connected to the capacitor 124, and a source connected to the ground terminal 100. The drains of the NMOS transistor 125 and the NMOS transistor 126 serve as an output terminal of the delay circuit 120. The capacitor 133 has one terminal connected to the output terminal of the delay circuit 120 and the other terminal connected to the bias circuit 131 and a gate of the PMOS transistor 134. The PMOS transistor 134 has a drain connected to a gate and a drain of the NMOS transistor 151, and has a source connected to the bias circuit 132. The drain of the PMOS transistor 134 serves as an output terminal of the constant current circuit 130. The NMOS transistor 151 has the gate and drain connected to a gate of the NMOS transistor 152, and has a source connected to the ground terminal 100. The NMOS transistor 152 has a drain connected to a connection point between the error amplifier circuit 102 and the bias circuit 103, and has a source connected to the ground terminal 100. The capacitor 143 has one terminal connected to the output terminal of the delay circuit 120 and the other terminal connected to the bias circuit 141 and a gate of the PMOS transistor 142. The PMOS transistor 142 has a drain connected to a source of the PMOS transistor 144 and a source connected to the power supply terminal 108. The PMOS transistor 144 has a gate connected to the output terminal of the amplifier 110 and a drain connected to the gate and drain of the NMOS transistor 151. The drain of the PMOS transistor 144 serves as an output terminal of the constant current circuit 140. The PMOS transistor 107 has a gate connected to an output terminal of the inverter 226, a drain connected to a source of the PMOS transistor 153, and a source connected to the power supply terminal 108. The PMOS transistor 153 has a gate connected to a connection point between the bias circuit 141 and the capacitor 143, and has a drain connected to the gate of the output transistor 104.

An operation of the voltage regulator according to the first embodiment is described below.

A voltage of the power supply terminal 108 is represented by "VDD"; a voltage of the ground terminal 100, "VSS"; a voltage of the reference voltage circuit 101, "Vref"; a voltage of the output terminal 109, "Vout"; and a voltage obtained by dividing the output voltage Vout by the resistors 105 and 106, "Vfb". The output terminal of the amplifier 111 is represented by "node A"; the output terminal of the amplifier 110, "node B"; the output terminal of the delay circuit 120, "node C"; the gate of the PMOS transistor 134 of the constant current circuit 130, "node D", the gate of the PMOS transistor 142 of the constant current circuit 140, "node E"; an output current of the constant current circuit 130, I130", and an output current of the constant current circuit 140, "I140". In this case, the current I140 is designed to be larger than the current I130.

In normal control, in the voltage regulator, the error amplifier circuit 102 compares the reference voltage Vref and the divided voltage Vfb with each other and outputs an output voltage to control the output transistor 104, to thereby maintain the output voltage Vout to be constant.

Figure 2:
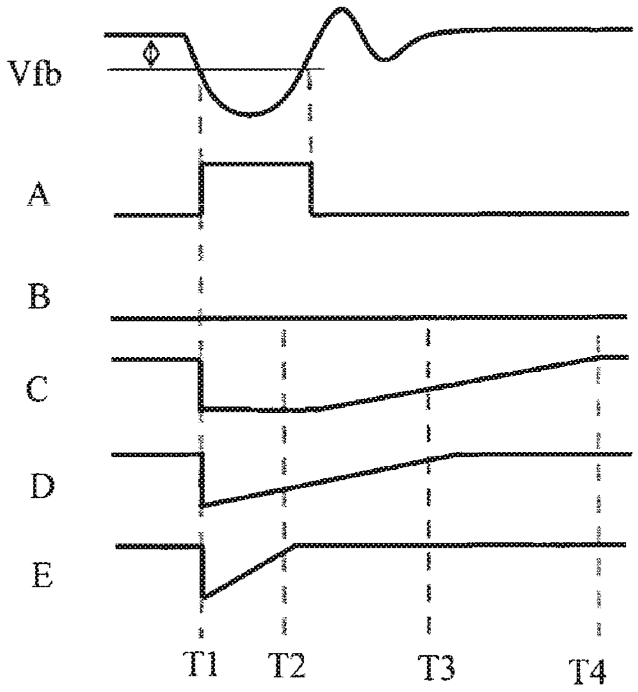
FIG. 2 is a timing chart illustrating an operation of the voltage regulator according to each of the first embodiment and a second embodiment of the present invention when overshoot occurs.

Next, an operation of the voltage regulator performed when undershoot occurs in the output voltage Vout is described. FIG. 2 is a timing chart when undershoot occurs in the output voltage Vout.

Before a time T1, the voltage regulator performs normal control. Offsets are set in the amplifiers 110 and 111 so that "Low" level may be output always in the normal control. The nodes A and B are at "Low" level, and hence the NMOS transistor 125 and the NMOS transistor 126 are turned off, the PMOS transistor 107 is turned off, and the PMOS transistor 144 is turned on. Accordingly, the node C is at "High" level. The node D and the node E are also at "High" level, and hence the PMOS transistors 134 and 142 are turned off and the PMOS transistor 153 is also turned off. Accordingly, the gate of the output transistor 104 is controlled by the output voltage of the error amplifier circuit 102. Further, the error amplifier circuit 102 is connected to the bias circuit 103 serving as a current source.

Now, undershoot occurs in the output voltage Vout to decrease the divided voltage Vfb. At a time T1, when the divided voltage Vfb becomes lower than a total of the reference voltage Vref and an offset voltage set in the amplifier 111, the output of the amplifier 111, namely the voltage of the node A, is switched to "High" level. The output of the amplifier 110, namely the voltage of the node B, maintains "Low" level. When the node A becomes "High" level, the NMOS transistor 125 is turned on, and the node C becomes "Low" level. Accordingly, the node D and the node E also become "Low" level, and hence the PMOS transistors 134 and 142 are turned on so that the current I130 and the current I140 flow to the NMOS transistor 151. The NMOS transistors 151 and 152 form a current mirror circuit, and hence a current corresponding to the current of the NMOS transistor 151 flows to the NMOS transistor 152 as well to increase the bias current of the error amplifier circuit 102. The error amplifier circuit 102 increases its response speed because of the increased bias current, thereby being capable of quickly improving the undershoot occurring in the output voltage Vout.

Further, the PMOS transistor 153 is turned on, but the gate voltage of the output transistor 104 is not affected because the PMOS transistor 107 is turned off. In this manner, the undershoot in the output voltage Vout is suppressed.

After that, the voltage of the node E is gradually increased by a delay circuit including the bias circuit 141 and the capacitor 143. Then, the PMOS transistor 142 is gradually turned off and completely turned off at a time T2, and hence the constant current circuit 140 stops outputting the current I140. Accordingly, the bias current of the error amplifier circuit 102 becomes a total of the current of the bias circuit 103 and a current corresponding to the current I130. Further, the voltage of the node D is gradually increased by a delay circuit including the bias circuit 131 and the capacitor 133. Then, the PMOS transistor 134 is gradually turned off and completely turned off at a time T3, and hence the constant current circuit 130 stops outputting the current I130. Accordingly, the bias current of the error amplifier circuit 102 becomes the current of the bias circuit 103.

When the undershoot in the output voltage Vout is suppressed, and the divided voltage Vfb becomes higher than the total of the reference voltage Vref and the offset voltage set in the amplifier 111, the output of the amplifier 111, namely the voltage of the node A, is switched to "Low" level. The gate of the NMOS transistor 125 is set to "Low" level by a delay circuit including the bias circuit 122 and the capacitor 121 to turn off the NMOS transistor 125. Then, the voltage of the node C is gradually increased by a delay circuit including the bias circuit 123 and the capacitor 124, and at a time T4, the voltage of the node C becomes "High" level.

In this manner, the bias current flowing through the error amplifier circuit 102 is decreased with a time difference after being increased once, and hence the undershoot in the output voltage Vout and the oscillation of the output voltage Vout can be prevented during an appropriate increase in current consumption.

Figure 3:
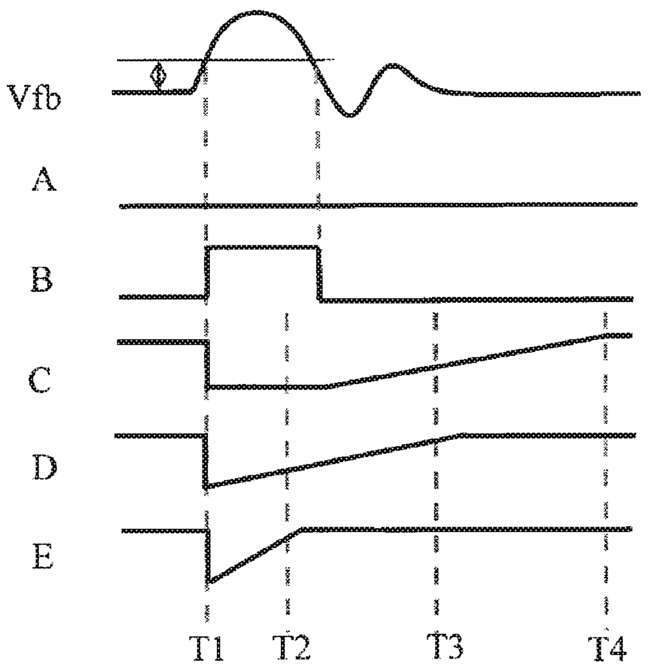
FIG. 3 is a timing chart illustrating an operation of the voltage regulator according to each of the first embodiment and the second embodiment of the present invention when undershoot occurs.

Next, an operation of the voltage regulator performed when overshoot occurs in the output voltage Vout is described. FIG. 3 is a timing chart when overshoot occurs in the output voltage Vout.

Overshoot occurs in the output voltage Vout to increase the divided voltage Vfb. At a time T1, when the divided voltage Vfb becomes higher than a total of the reference voltage Vref and an offset voltage set in the amplifier 110, the output of the amplifier 110, namely the voltage of the node B, is switched to "High" level. The output of the amplifier 111, namely the voltage of the node A, maintains "Low" level. When the node B becomes "High" level, the NMOS transistor 126 is turned on, the PMOS transistor 144 is turned off, and the PMOS transistor 107 is turned on. When the NMOS transistor 126 is turned on, the node C becomes "Low" level, and accordingly, the node D and the node E also become "Low" level. Then, the PMOS transistors 134, 142, and 153 are turned on. In this case, the PMOS transistor 144 is turned off, and hence only the current I130 flows to the NMOS transistor 151. Accordingly, a current corresponding to the current of the NMOS transistor 151 flows to the NMOS transistor 152 as well to increase the bias current of the error amplifier circuit 102.

Further, the PMOS transistor 107 and the PMOS transistor 153 are turned on, and hence the gate of the output transistor 104 is pulled up to the voltage VDD of the power supply terminal 108. Accordingly, the output transistor 104 is gradually turned off because the gate voltage thereof is increased, and hence the overshoot is improved quickly.

The voltage of the node E is gradually increased by the delay circuit including the bias circuit 141 and the capacitor 143. Then, the PMOS transistors 142 and 153 are gradually turned off and completely turned off at a time T2. Therefore, the pull-up of the gate of the output transistor 104 is gradually stopped. Further, the voltage of the node D is gradually increased by the delay circuit including the bias circuit 131 and the capacitor 133. Then, the PMOS transistor 134 is gradually turned off and completely turned off at a time T3, and hence the constant current circuit 130 stops outputting the current I130. Accordingly, the bias current of the error amplifier circuit 102 becomes the current of the bias circuit 103.

When the overshoot in the output voltage Vout is suppressed, and the divided voltage Vfb becomes lower than the total of the reference voltage Vref and the offset voltage set in the amplifier 110, the output of the amplifier 110, namely the voltage of the node B, is switched to "Low" level.

Accordingly, the NMOS transistor 126 is turned off. Then, the voltage of the node C is gradually increased by the delay circuit including the bias circuit 123 and the capacitor 124, and at a time T4, the voltage of the node C becomes "High" level.

In this manner, after the overshoot is improved and after the pull-up of the gate of the output transistor 104 is stopped, the bias current of the error amplifier circuit 102 is allowed to continue flowing therethrough for a while. Consequently, the output voltage Vout can be prevented from oscillating after the pull-up is stopped.

As described above, the voltage regulator according to the first embodiment is configured to maintain the increased bias current of the time error amplifier circuit 102 for a certain time after the overshoot or undershoot is suppressed, thereby being capable of preventing the oscillation of the output voltage Vout.

Note that, the circuits described in the first embodiment are merely illustrative, and the present invention is not limited thereto. For example, the constant current circuits 130 and 140 each only need to output a bias current for a predetermined time period in response to the output signal of the delay circuit 120. Further, the logic and connection of the amplifiers 110 and 111 are not limited to the illustrated circuits as long as the above-mentioned function is satisfied.

Second Embodiment

Figure 4:
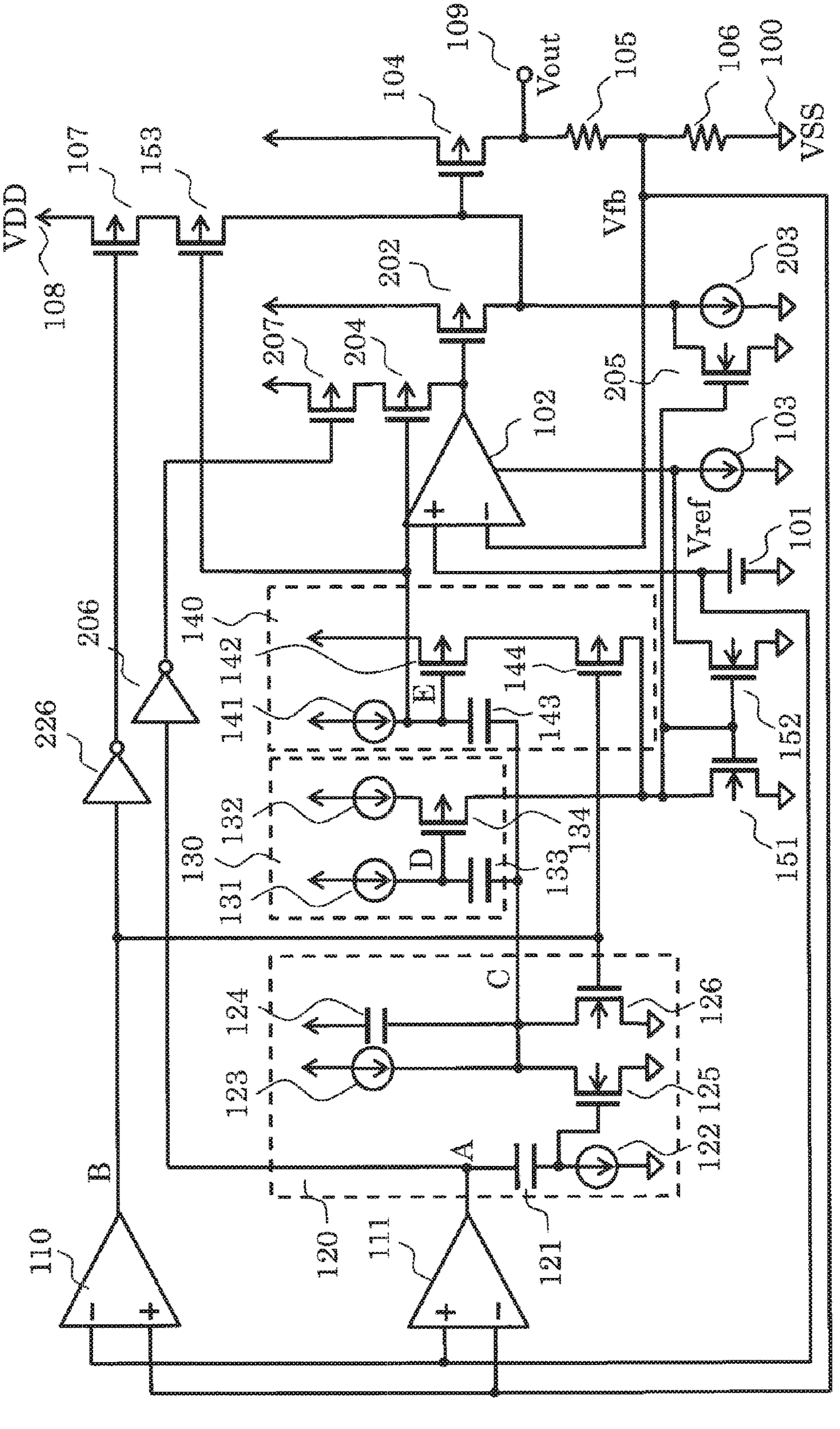
FIG. 4 is a circuit diagram of the voltage regulator according to the second embodiment of the present invention.

FIG. 4 is a circuit diagram of a voltage regulator according to a second embodiment of the present invention. The second embodiment differs from the first embodiment in that an amplifier stage including a PMOS transistor 202 and a bias circuit 203, PMOS transistors 204 and 207, an NMOS transistor 205, and an inverter 206 are added between the error amplifier circuit 102 and the output transistor 104.

The PMOS transistor 202 has a gate connected to the output terminal of the error amplifier circuit 102, a drain connected to the gate of the output transistor 104, and a source connected to the power supply terminal 108. The PMOS transistor 207 has a gate connected to an output terminal of the inverter 206, a drain connected to a source of the PMOS transistor 204, and a source connected to the power supply terminal 108. The PMOS transistor 204 has a gate connected to the connection point between the bias circuit 141 and the capacitor 143, and has a drain connected to the gate of the PMOS transistor 202. The bias circuit 203 is connected to the PMOS transistor 202 as a current source, and the other terminal thereof is connected to the ground terminal 100. The NMOS transistor 205 has a gate connected to the gate and drain of the NMOS transistor 151, a drain connected to a connection point between the bias circuit 203 and the PMOS transistor 202, and a source connected to the ground terminal 100. The inverter 206 has an input terminal connected to the output of the amplifier 111. As compared with the first embodiment, the inverting input terminal and the non-inverting input terminal of the error amplifier circuit 102 switch places with each other. The amplifier 111, the constant current circuit 140, the delay circuit 120, the inverter 206, and the PMOS transistor 207 construct an undershoot improvement circuit. The other connections are the same as those in the first embodiment.

Next, an operation of the voltage regulator according to the second embodiment is described. The voltage of the power supply terminal 108 is represented by "VDD"; the voltage of the ground terminal 100, "VSS"; the voltage of the reference voltage circuit 101, "Vref"; the voltage of the output terminal 109, "Vout"; and the voltage obtained by dividing the output voltage Vout by the resistors 105 and 106, "Vfb". The output terminal of the amplifier 111 is represented by "node A"; the output terminal of the amplifier 110, "node B"; the output terminal of the delay circuit 120, "node C"; the gate of the PMOS transistor 134 of the constant current circuit 130, "node D", the gate of the PMOS transistor 142 of the constant current circuit 140, "node E"; the output current of the constant current circuit 130, I130", and the output current of the constant current circuit 140, "I140". In this case, the current I140 is designed to be larger than the current I130. An error amplifier circuit in this embodiment includes the error amplifier circuit 102 that operates as an amplifier stage for inputting the reference voltage Vref and the divided voltage Vfb, and the amplifier stage including the PMOS transistor 202 and the bias circuit 203.

In normal control, the voltage regulator operates in the same manner as in the first embodiment. An operation of the voltage regulator performed when undershoot occurs in the output voltage Vout is described. FIG. 2 is a timing chart when undershoot occurs in the output voltage Vout.

Before a time T1 of FIG. 2, the node A and the node B are at "Low" level, and hence the NMOS transistor 125 and the NMOS transistor 126 are turned off, the PMOS transistors 107 and 207 are turned off, and the PMOS transistor 144 is turned on. The node D and the node E are also at "High" level, and hence the PMOS transistors 134 and 142 are turned off and the PMOS transistors 153 and 204 are also turned off.

Now, undershoot occurs in the output voltage Vout to decrease the divided voltage Vfb. At the time T1, when the divided voltage Vfb becomes lower than a total of the reference voltage Vref and an offset voltage set in the amplifier 111, the output of the amplifier 111, namely the voltage of the node A, is switched to "High" level. The output of the amplifier 110, namely the voltage of the node B, maintains "Low" level. When the node A becomes "High" level, the PMOS transistor 207 is turned on, and the node C becomes "Low" level because the NMOS transistor 125 is turned on. Accordingly, the node D and the node E also become "Low" level, and hence the PMOS transistors 134 and 142 are turned on so that the current I130 and the current I140 flow to the NMOS transistor 151.

The NMOS transistors 151, 152, and 205 form a current mirror circuit, and hence a current corresponding to the current of the NMOS transistor 151 flows to the NMOS transistors 152 and 205 as well to increase the bias currents of the error amplifier circuit 102 and the PMOS transistor 202. The error amplifier circuit 102 increases its response speed because of the increased bias current, thereby being capable of further quickly increasing a gate voltage of the PMOS transistor 202. In addition, the PMOS transistor 204 is turned on to pull up the gate voltage of the PMOS transistor 202 to the voltage VDD of the power supply terminal 108. As a result, the PMOS transistor 202 is turned off to relatively increase the current of the NMOS transistor 205, and the gate-source voltage of the output transistor 104 is increased to increase the current flowing into the output terminal 109, to thereby suppress the undershoot in the output voltage Vout to be small.

After that, at a time T2, the constant current circuit 140 stops outputting the current I140, and hence the bias currents of the error amplifier circuit 102 and the PMOS transistor 202 become a total of the current of the bias circuit 103 or 203 and a current corresponding to the current I130. In this case, the PMOS transistor 204 is also turned off, and hence the operation of pulling up the gate of the PMOS transistor 202 by the PMOS transistors 207 and 204 is also stopped. In addition, at a time T3, the constant current circuit 130 stops outputting the current I130. Accordingly, the bias currents of the error amplifier circuit 102 and the PMOS transistor 202 are returned to the currents of the bias circuits 103 and 203, respectively. Through the operation described above, even after the undershoot in the output voltage Vout is suppressed, the bias currents of the error amplifier circuit 102 and the PMOS transistor 202 are allowed to continue flowing therethrough for a while. Consequently, the output voltage Vout can be prevented from oscillating after the pull-up is stopped.

Next, when overshoot occurs in the output voltage Vout, the PMOS transistor 207 is turned off, and hence no current flows through the PMOS transistor 204. Further, because the PMOS transistor 107 is turned on, a current flows through the PMOS transistor 153 to pull up the gate of the output transistor 104 to the voltage VDD of the power supply terminal 108. In addition, the current values of the bias circuits 103 and 203 are increased by the amount of the current I130 owing to the action of the NMOS transistors 152 and 205. In this manner, after the overshoot in the output voltage Vout is suppressed and the pull-up of the gate of the output transistor 104 is stopped, the bias currents of the error amplifier circuit 102 and the PMOS transistor 202 are allowed to continue flowing therethrough for a while. Consequently, the output voltage Vout can be prevented from oscillating after the pull-up is stopped.

Further, the circuits described in the second embodiment are merely illustrative, and the present invention is not limited thereto. For example, the constant current circuits 130 and 140 each only need to output a bias current for a predetermined time period in response to the output signal of the delay circuit 120. Further, the logic and connection of the amplifiers 110 and 111 are not limited to the illustrated circuits as long as the above-mentioned function is satisfied.

As described above, the voltage regulator according to the second embodiment is configured to maintain the increased bias current of the time error amplifier circuit 102 for a certain time after the overshoot or undershoot is suppressed, thereby being capable of preventing the oscillation of the output voltage Vout.

Third Embodiment

Figure 5:
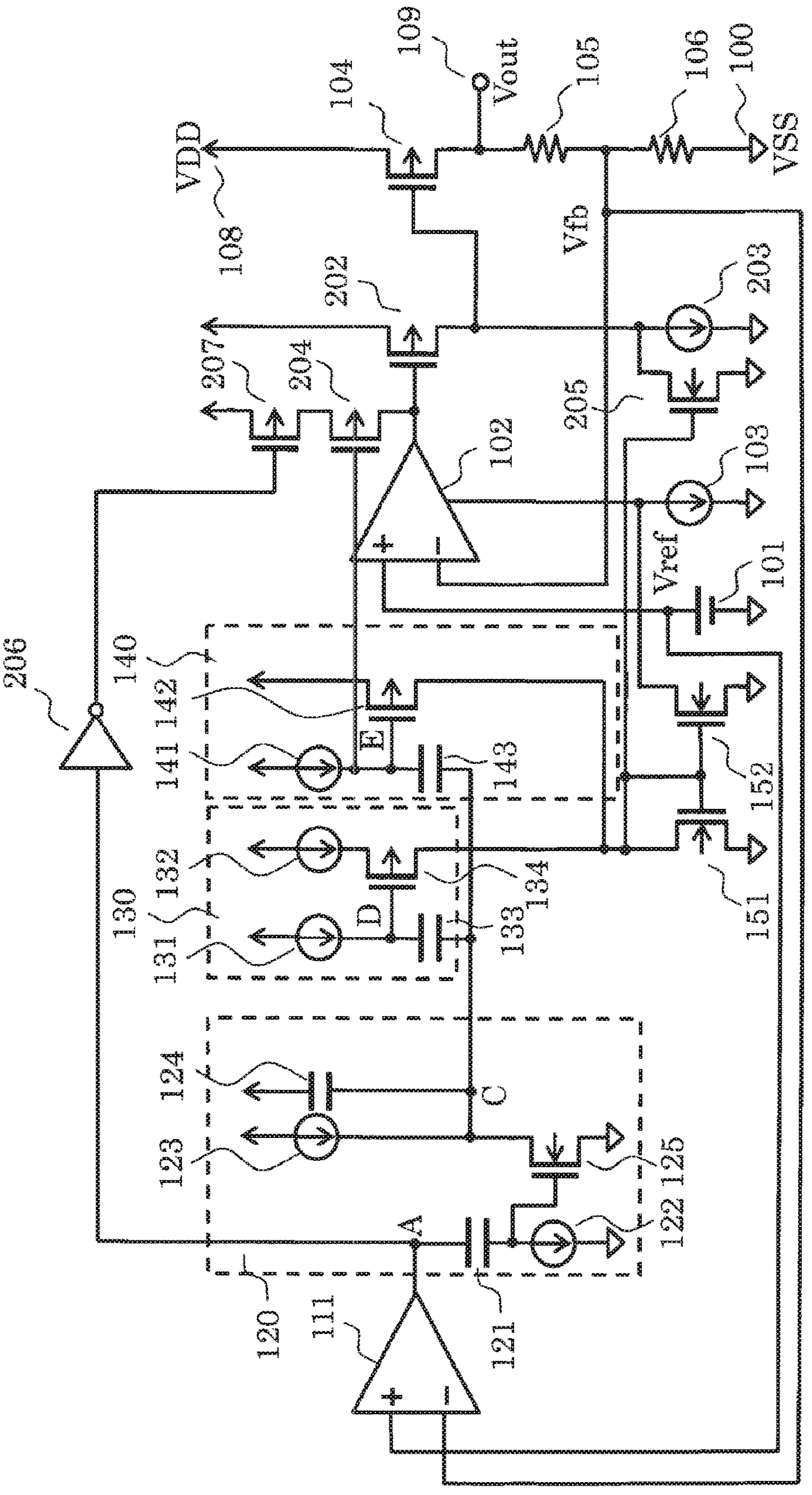
FIG. 5 is a circuit diagram of a voltage regulator according to a third embodiment of the present invention.

FIG. 5 is a circuit diagram of a voltage regulator according to a third embodiment of the present invention. The third embodiment differs from the second embodiment in that the amplifier 110, the inverter 226, the PMOS transistors 107, 144, and 153, and the NMOS transistor 126 are deleted so as to enable only the undershoot improvement function. The drain of the PMOS transistor 142 is connected to the drain of the NMOS transistor 151. The other connections are the same as those in the second embodiment.

When undershoot occurs, the voltage regulator according to the third embodiment operates in the same manner as in the voltage regulator according to the second embodiment. However, when overshoot occurs, the voltage regulator according to the third embodiment does not operate to suppress the overshoot. Note that, the inverter 206 and the PMOS transistors 204 and 207 may be deleted so that undershoot may be suppressed simply by increasing the bias current of the error amplifier circuit 102 by the constant current circuit 140.

As described above, the voltage regulator according to the third embodiment is configured to maintain the increased bias current of the time error amplifier circuit 102 for a certain time after the undershoot is suppressed, thereby being capable of preventing the oscillation of the output voltage Vout.

Fourth Embodiment

Figure 6:
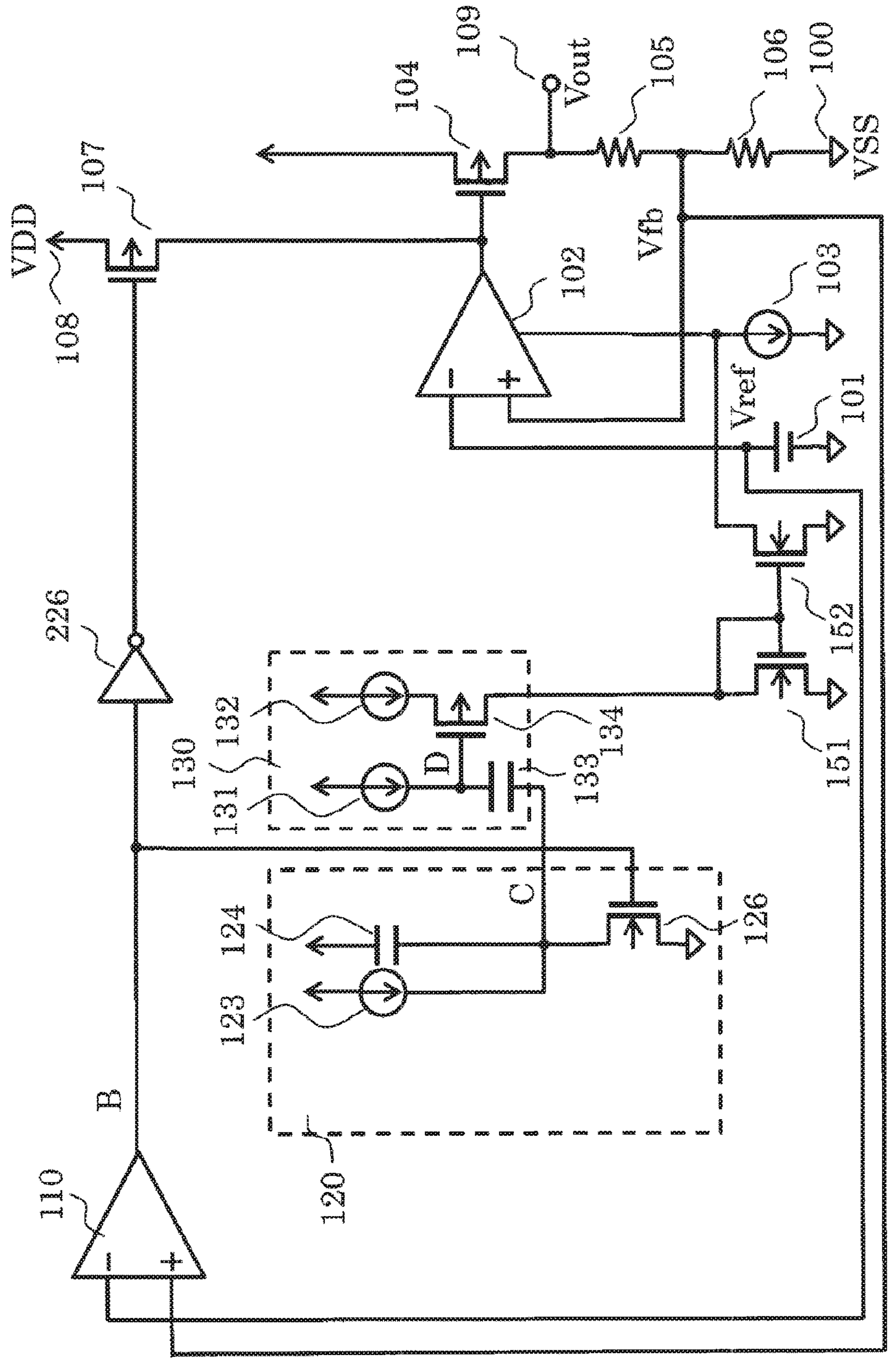
FIG. 6 is a circuit diagram of a voltage regulator according to a fourth embodiment of the present invention.
Figure 7:
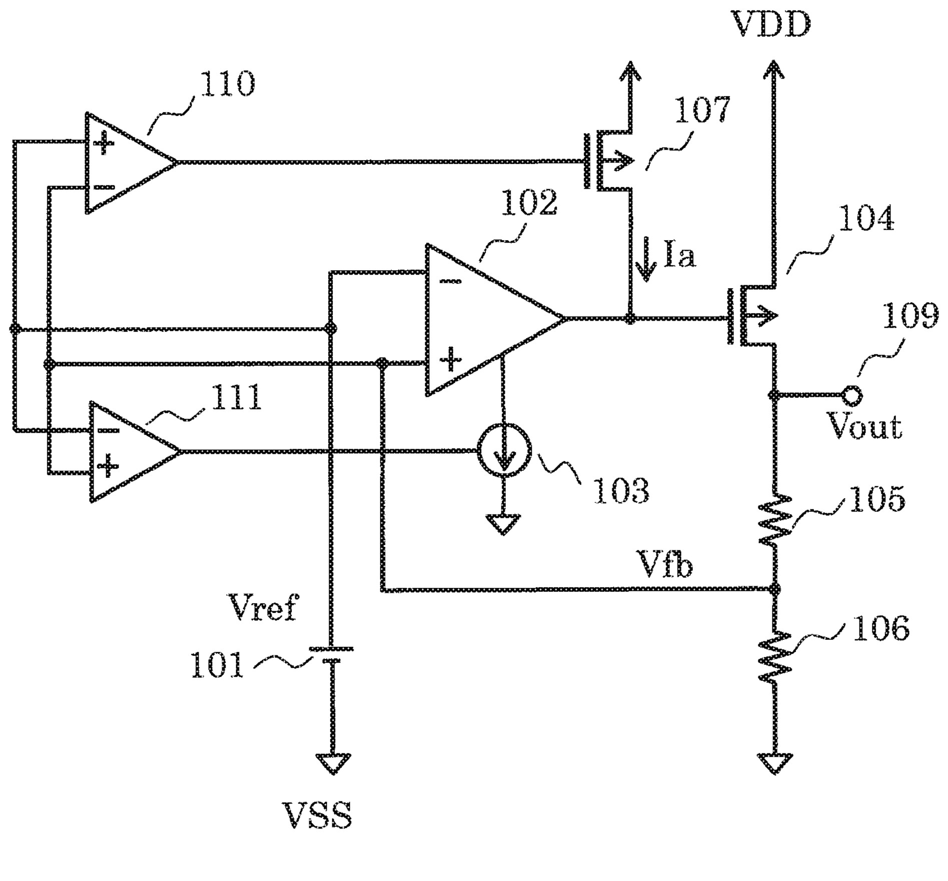
FIG. 7 PRIOR ART
FIG. 7 is a circuit diagram of a related-art voltage regulator.
Figure 8:
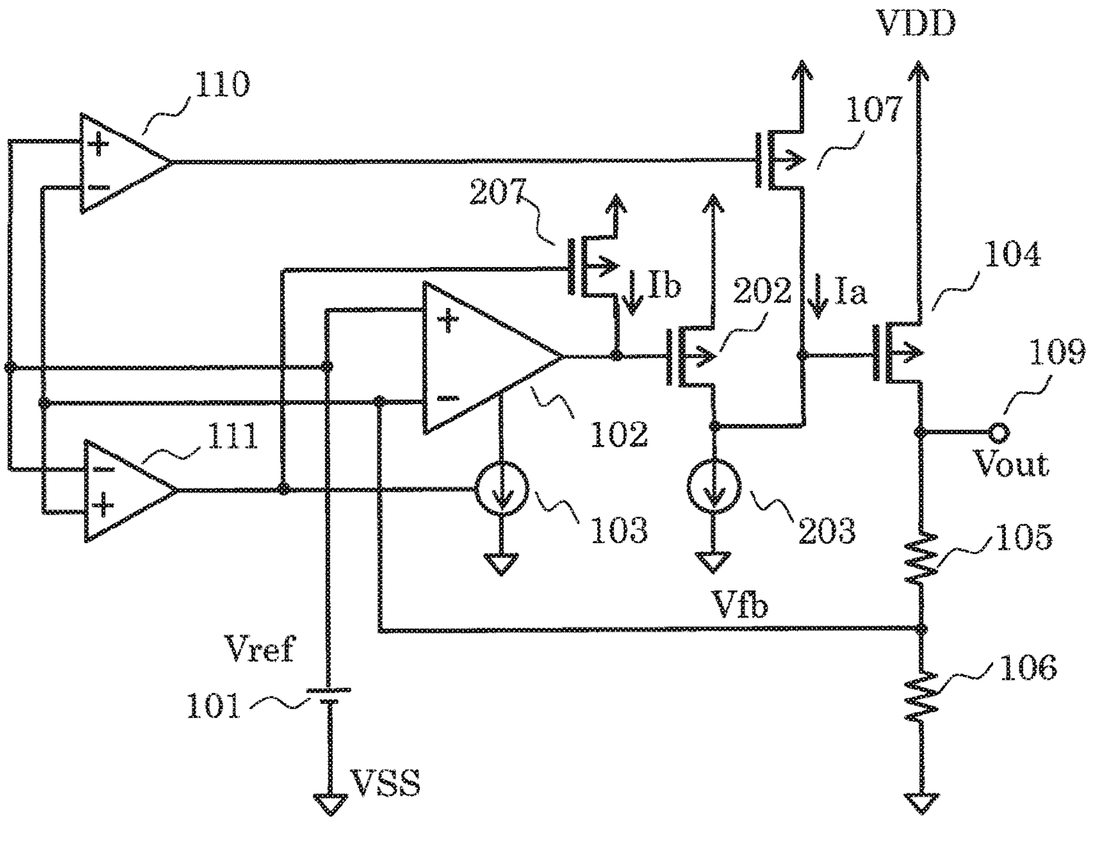
FIG. 8 PRIOR ART
FIG. 8 is a circuit diagram illustrating another example of the related-art voltage regulator.

FIG. 6 is a circuit diagram of a voltage regulator according to a fourth embodiment of the present invention. The fourth embodiment differs from the second embodiment in that the amplifier 111, the inverter 206, the PMOS transistors 207, 204, 202, and 153, the NMOS transistors 125 and 205, the bias circuits 122 and 203, the capacitor 121, and the constant current circuit 140 are deleted so as to enable only the overshoot improvement function. The gate of the PMOS transistor 104 is connected to an output of the error amplifier circuit 102 and the drain of the PMOS transistor 107. The other connections are the same as those in the second embodiment.

When overshoot occurs, the voltage regulator according to the fourth embodiment operates in the same manner as in the voltage regulator according to the second embodiment. However, when undershoot occurs, the voltage regulator according to the fourth embodiment does not operate to suppress the undershoot.

As described above, the voltage regulator according to the fourth embodiment is configured to maintain the increased bias current of the time error amplifier circuit 102 for a certain time after the overshoot is suppressed, thereby being capable of preventing the oscillation of the output voltage Vout.

What is claimed is:

1. A voltage regulator, comprising:

an error amplifier circuit that amplifies a difference between a divided voltage from an output voltage of an output transistor and a reference voltage, and that outputs an amplified difference to control a gate of the output transistor;

a first amplifier connected to the divided voltage at a first terminal thereof and that detects an undershoot in the output voltage;

a second amplifier connected to the divided voltage at a first terminal thereof and that detects an overshoot in the output voltage, where the first terminal of the first amplifier has an opposite polarity to the first terminal of the second amplifier;

a first constant current circuit connected to the first amplifier and to the second amplifier and that increases a bias current of the error amplifier circuit by a first amount for a first time period in response to a signal based on one of an output signal of the first amplifier and an output signal of the second amplifier;

a second constant current circuit connected to the first amplifier and that increases the bias current of the error amplifier circuit by a second amount larger than the first amount for a second time period shorter than the first time period in response to a signal based on the output signal of the first amplifier; and a first switch circuit that pulls up the gate of the output transistor in response to a signal based on the output signal of the second amplifier.

2. A voltage regulator according to claim 1, wherein the first constant current circuit comprises:

a first delay circuit that receives the signal based on one of the output signal of the first amplifier and the output signal of the second amplifier; and a second switch circuit controlled by an output signal of the first delay circuit; and the second constant current circuit comprises:
a second delay circuit that receives the signal based on the output signal of the first amplifier; and
a third switch circuit connected to an output of the second delay circuit.

3. A voltage regulator according to claim 2, further comprising a fourth switch circuit connected in series to the first switch circuit, wherein the fourth switch circuit is controlled by an output signal of the second delay circuit.

4. A voltage regulator according to claim 3, wherein:
the error amplifier circuit comprises:
a first amplifier stage the receives the divided voltage and the reference voltage; and
a second amplifier stage that controls the output transistor; and
the voltage regulator further comprises a fifth switch circuit that pulls up an input of the second amplifier stage in response to the signal based on the output signal of the first amplifier.

5. A voltage regulator according to claim 4, further comprising a sixth switch circuit connected in series to the fifth switch circuit, wherein the sixth switch circuit is controlled by the output signal of the second delay circuit.

6. A voltage regulator, comprising:
an error amplifier circuit that amplifies a difference between a divided voltage from an output voltage output by an output transistor and a reference voltage, and that outputs the amplified difference to control a gate of the output transistor, the error amplifier circuit comprising a first amplifier stage that receives the divided voltage and the reference voltage, and a second amplifier stage that includes a bias circuit and that controls the output transistor;
an undershoot improvement circuit comprising an amplifier for detecting that undershoot occurs in the output voltage, the undershoot improvement circuit configured to operate to improve the undershoot occurring in the output voltage; and
a first constant current circuit that increases a bias current of the error amplifier circuit by a first amount for a first time period longer than an operating time period of the undershoot improvement circuit in response to a signal based on an output signal of the amplifier.

7. A voltage regulator according to claim 6, wherein
the voltage regulator further comprises a first switch circuit that pulls up an input of the second amplifier stage in response to the signal based on the output signal of the amplifier.

8. A voltage regulator according to claim 7, wherein the undershoot improvement circuit further comprises a second constant current circuit that increases the bias current of the error amplifier circuit by a second amount larger than the first amount for a second time period shorter than the first time period in response to the signal based on the output signal of the amplifier.

9. A voltage regulator according to claim 8, wherein the first constant current circuit comprises:
a first delay circuit the receives the signal based on the output signal of the amplifier; and
a second switch circuit controlled by an output signal of the first delay circuit; and
the second constant current circuit comprises:
a second delay circuit that receives the signal based on the output signal of the amplifier; and
a third switch circuit connected to an output of the second delay circuit.

10. A voltage regulator according to claim 9, further comprising a fourth switch circuit connected in series to the first switch circuit, wherein the fourth switch circuit is controlled by an output signal of the second delay circuit.

* * * * *